United States Patent
Braghin et al.

(10) Patent No.: US 11,386,226 B2
(45) Date of Patent: Jul. 12, 2022

(54) PREVENTING LEAKAGE OF SELECTED INFORMATION IN PUBLIC CHANNELS

(71) Applicant: INTERNATIONAL BUSINESS MACHINES CORPORATION, Armonk, NY (US)

(72) Inventors: Stefano Braghin, Dublin (IE); Ioannis Gkoufas, East Road (IE); Valentina Rho, Dublin (IE)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 191 days.

(21) Appl. No.: 16/659,225

(22) Filed: Oct. 21, 2019

(65) Prior Publication Data

US 2021/0117567 A1    Apr. 22, 2021

(51) Int. Cl.
*G06F 21/62* (2013.01)

(52) U.S. Cl.
CPC .................. *G06F 21/6245* (2013.01)

(58) Field of Classification Search
CPC ................................................. G06F 21/6245
See application file for complete search history.

(56) References Cited

U.S. PATENT DOCUMENTS

| | | | |
|---|---|---|---|
| 6,295,606 B1 | 9/2001 | Messerges et al. | |
| 7,685,194 B2 | 3/2010 | Kabra et al. | |
| 8,127,360 B1 | 2/2012 | Wilhelm | |
| 8,284,905 B1 | 10/2012 | Suri | |
| 10,169,315 B1* | 1/2019 | Heckel | G06F 40/30 |
| 2003/0023451 A1* | 1/2003 | Willner | G06F 21/6245 705/26.1 |
| 2008/0172745 A1 | 7/2008 | Reinart et al. | |
| 2009/0067150 A1 | 3/2009 | Ito | |
| 2013/0291058 A1* | 10/2013 | Wollenstein | H04L 63/20 726/1 |
| 2018/0027006 A1* | 1/2018 | Zimmermann | G06F 21/6218 726/11 |
| 2018/0293400 A1* | 10/2018 | Borup | G06F 21/554 |
| 2019/0236305 A1 | 8/2019 | Antonatos et al. | |
| 2020/0201679 A1* | 6/2020 | Wentz | G06F 9/468 |

(Continued)

FOREIGN PATENT DOCUMENTS

| | | |
|---|---|---|
| EP | 3506129 A1 | 7/2019 |
| JP | H09154119 A | 6/1997 |

(Continued)

OTHER PUBLICATIONS

"MobileAppScrutinator: A simple yet efficient dynamic analysis approach for detecting privacy leaks across mobile OSs." Achara et al. arXiv preprint arXiv:1605.08357 (2016), (14 Pages).

(Continued)

*Primary Examiner* — Harris C Wang
(74) *Attorney, Agent, or Firm* — Griffiths & Seaton PLLC

(57) ABSTRACT

Various embodiments are provided for preventing disclosure of confidential data in a computing environment are provided. Data may be inspected prior to publication to a communication channels. Selected portions of the data may be extracted. The selected portions of the data may be filtered according to degree of appropriateness defined in one or more publishing policies or rules prior to sending the filtered data to the communication channel.

20 Claims, 10 Drawing Sheets

(56) References Cited

U.S. PATENT DOCUMENTS

2020/0327252 A1* 10/2020 McFall .................. G06F 21/78
2021/0117567 A1* 4/2021 Braghin .............. G06F 21/6245

FOREIGN PATENT DOCUMENTS

| | | |
|---|---|---|
| JP | 2006318104 A | 11/2006 |
| JP | 2010266940 A | 11/2010 |
| WO | 2019070675 A1 | 4/2019 |
| WO | 2019077440 A1 | 4/2019 |

OTHER PUBLICATIONS

"Beyond sunglasses and spray paint: A taxonomy of surveillance countermeasures." Shay et al., 2013 IEEE International Symposium on Technology and Society (ISTAS): Social Implications of Wearable Computing and Augmediated Reality in Everyday Life. IEEE, 2013, (11 Pages).

"A detection system for the sources of information leaks on networked smart devices." Syed et al., Ecole polytechnique de Louvain, Université catholique de Louvain, 2016. Prom. : Sadre, Ramin, (88 Pages).

"New comprehensive taxonomies on mobile security and malware analysis." Canbek et al., International Journal of Information Security Science (IJISS) 5.4 (2016): 106-138, (33 Pages).

* cited by examiner

PREVENTING LEAKAGE OF SELECTED INFORMATION IN PUBLIC CHANNELS

BACKGROUND OF THE INVENTION

Field of the Invention

The present invention relates in general to computing systems, and more particularly to, various embodiments for preventing leakage of selected information in public channels using a computing processor.

Description of the Related Art

In today's interconnected and complex society, computers and computer-driven equipment are more commonplace. Processing devices, with the advent and further miniaturization of integrated circuits, have made it possible to be integrated into a wide variety of devices. The advent of computers and networking technologies have made possible the intercommunication of people from one side of the world to the other. However, ensuring data integrity and security are a continuous challenge to address.

SUMMARY OF THE INVENTION

Various embodiments for preventing disclosure of confidential data in a computing environment are provided. In one embodiment, by way of example only, a method for preventing disclosure of confidential data in a computing environment, by a processor, is provided. Data may be inspected prior to publication to a communication channels. Selected portions of the data may be extracted. The selected portions of the data may be filtered according to degree of appropriateness defined in one or more publishing policies or rules prior to sending the filtered data to the communication channel.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
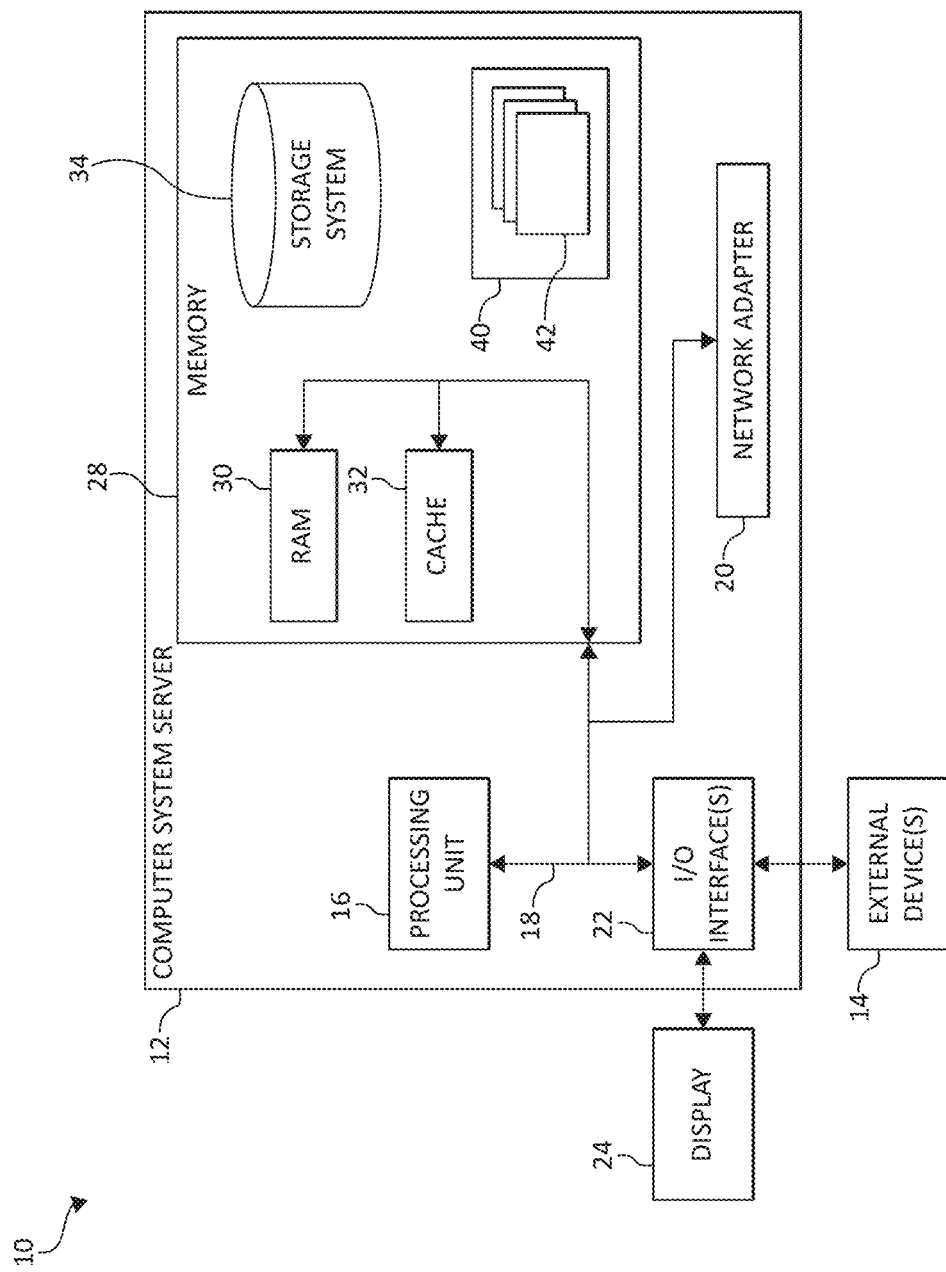
FIG. 1 is a block diagram depicting an exemplary cloud computing node according to an embodiment of the present invention.

In recent years, people have been witnessing a data explosion with data being estimated in the order of zettabytes. Analysing this wealth and volume of data offers remarkable opportunities for growth in various industries and sectors (of types of entities (e.g., companies, governments, academic institutions, organizations, etc.). However, the majority of these datasets (e.g., healthcare data, telecommunication data, banking data, etc.) are proprietary and many contain personal (e.g., personal identifiable information "PII") and/or business sensitive information. Examples of sensitive data include patient records, special housing information, tax records, governmental issued identification numbers (e.g., social security number), banking/financial data numbers (e.g., a bank account number, credit/debit card numbers, etc.), customer purchase records, academic records, mobile call detail records (CDR), etc. This type of data is often considered as private and confidential and should be protected from access by unauthorized users.

In many instances, data leakages of certain types of data (e.g., classified, private, sensitive, confidential, and/or proprietary data) may be due to unintended human error (e.g., misconfigurations, poor data governance, mistakes, distractions, etc.), rather than attacks by rogue/outside hackers. Several approaches have been taken to address the issue, mainly through access control or encryption, hence by restricting who can access specific messages, and training, hence trying to better educate users relating to the type of data eligible for sharing or disclosure to $3^{rd}$ parties.

However, such efforts are still insufficient to protect the leakage of selected type of data such as, for example, intentially or unintentionally disclosing passwords, confidential files, or other type of protected shared/published in public channels. Thus, the present invention provides for preventing disclosure of confidential data in a computing environment, by a processor, is provided. Data may be inspected prior to publication to a communication channels. Selected portions of the data may be extracted. The selected portions of the data may be filtered according to degree of appropriateness defined in one or more publishing policies or rules prior to sending the filtered data to the communication channel.

In an additional aspect, the present invention provides for preventing selected types of data information (e.g., sensitive, classified, confidential, protect, etc.) from being shared, disclosed, and/or published in a public channel. One or more operations for data and/or document type identification, classification, de-identification, and anonymization to ensure required security and privacy are provided herein. For example, a message (e.g., an email) along with one or more associated files may be temporarily suspended for identification prior to being published/shared in public channel. The message and/or file may be filtered from the queue if the message and/or file are detected as violating one or more publishing/security and/or privacy rules. Optionally, mechanisms of the illustrated embodiments may be added to one or more alternative computing systems used to deliver messages in order to filter the recipients of the messages according to the semantics detected in the message content. Thus, the present invention may employ the operations described herein for preventing leakage of selected information in public channels independently of any alternative, underlying computing implementation.

In one aspect, mechanisms of the illustrated embodiments may inspect the data prior to being communicated to a public channel to ensure that no classified information (e.g., personal information, personal health information and/or any other sensitive information which may be herein referred to as "classified data") is released (e.g., leaked).

In an additional aspect, the present invention may use and/or apply one or more data security rules, policies, and/or requirements upon receiving and analyzing user input data to prevent publication/sharing of data/raw data (e.g., classified/private data) by filtering sensitive data according to one or more data security rules, policies, and/or requirements.

In one aspect, if the classified/private data is detected, the present invention filters the classified/private data (e.g., sensitive information) and/or replace the classified/private data with non-classified/non-private data (e.g., non-sensitive information). That is, a machine learning operation may perform one or more machine learning operations (e.g., natural language processing and/or artificial intelligence "AI" operations) to learn data that may be determined to be classified (e.g., private, personal, sensitive, and/or proprietary). The selected portion of data that is determined to be classified/private data may be filtered and/or anonymized.

In an additional aspect, present invention may be implemented as hook or an extension in a client for a team collaboration software tool and/or online services, or a browser extension if the web client is targeted. In one aspect, the present invention may intercept messages in the team collaboration software tool and/or online services and analyzes the content using a combination of information extraction, a named entity recognition ("NER"), semantic expressions, document processing, and/or multi-topic classification operations, while also leveraging a data privacy toolkit identification capabilities. A notification can be performed by displaying a user message and/or an alert popup to inform the user and then query/ask for a confirmation of the identification of sensitive information (e.g., personal identification information "PII", passwords, classified data, confidential data, protected data, etc.)

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
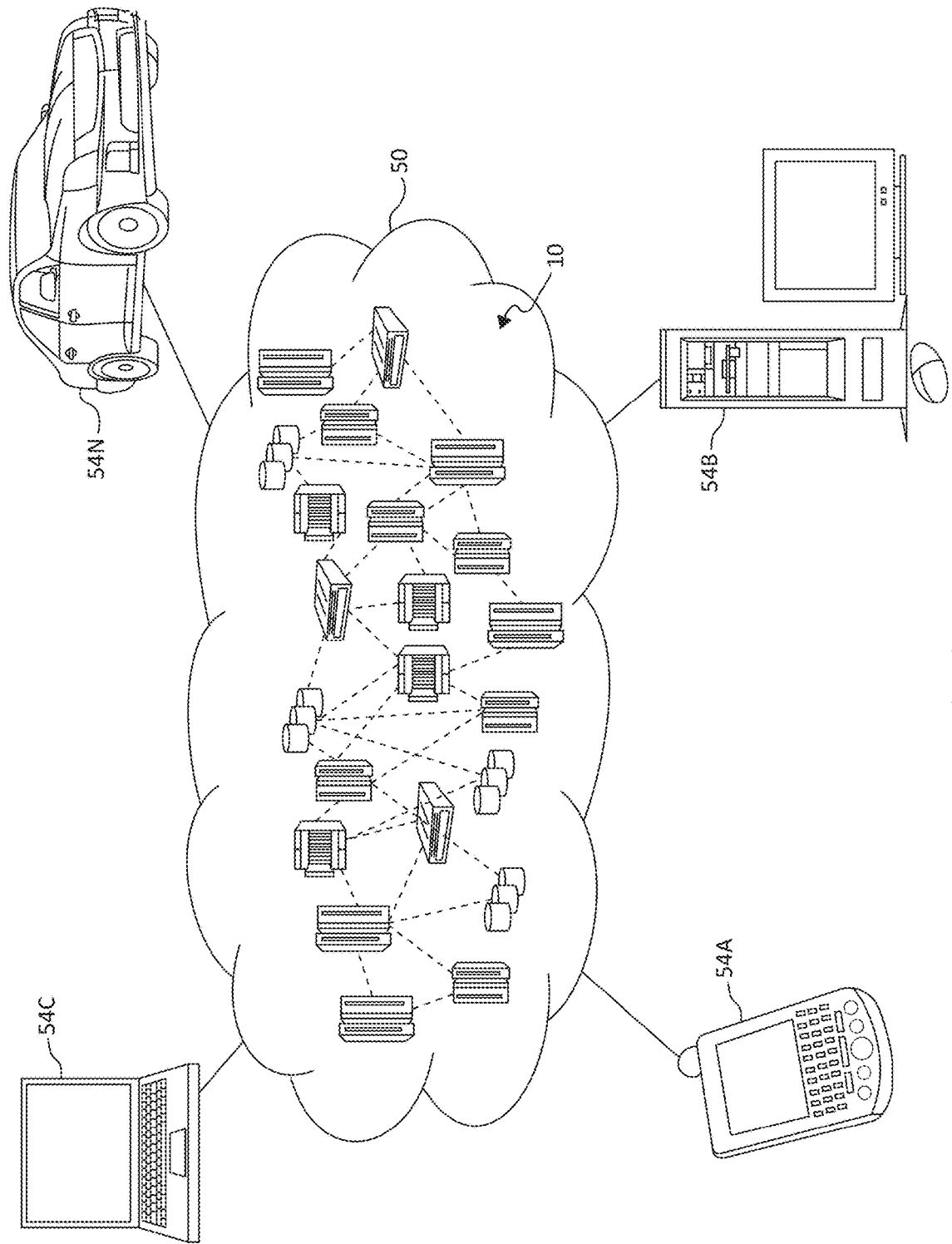
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
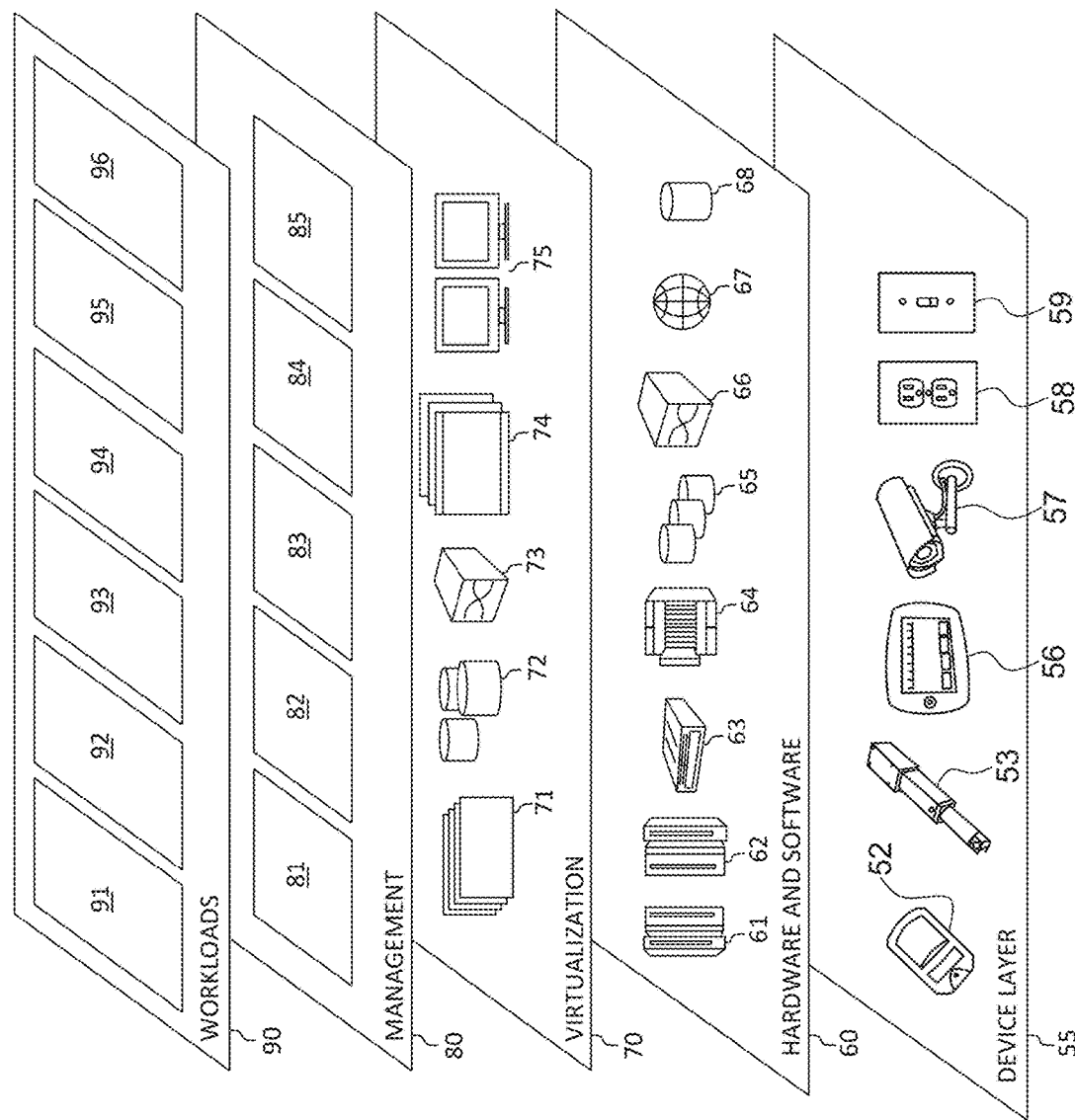
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for preventing data leakage. In addition, workloads and functions 96 for preventing data leakage may include such operations as data analysis (including data collection and processing) and data analytics functions. One of ordinary skill in the art will appreciate that the workloads and functions 96 for preventing data leakage may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
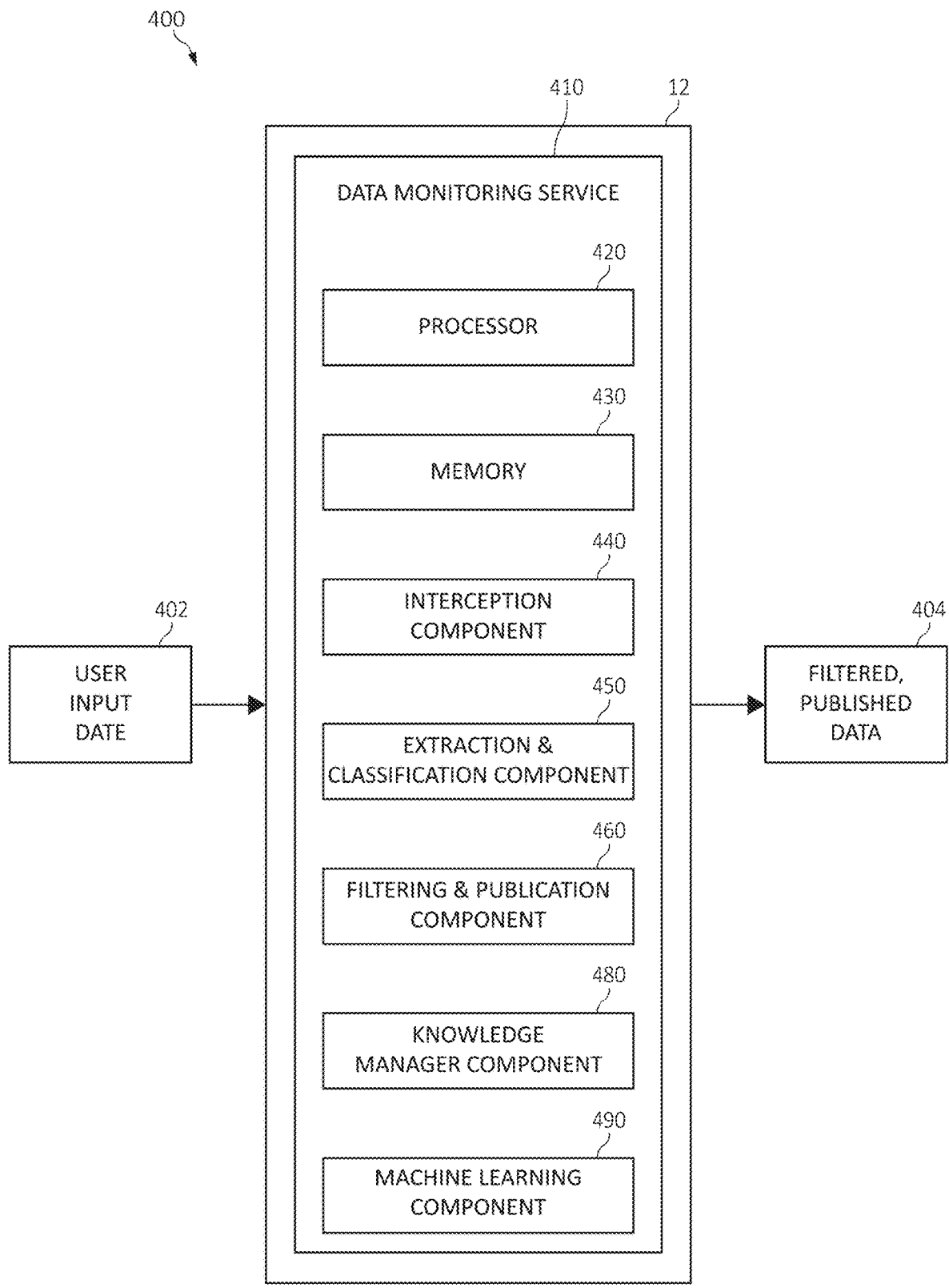
FIG. 4 is an additional block diagram depicting various user hardware and cloud computing components functioning in accordance with aspects of the present invention.

Turning now to FIG. 4, a block diagram depicting exemplary functional components 400 according to various mechanisms of the illustrated embodiments is shown for preserving data security in a shared computing file system. In one aspect, one or more of the components, modules, services, applications, and/or functions described in FIGS. 1-3 may be used in FIG. 4.

A data monitoring service 410 is shown, incorporating processing unit 420 to perform various computational, data processing and other functionality in accordance with various aspects of the present invention. The data monitoring service 410 may be included in computer system/server 12, as described in FIG. 1. The processing unit 420 ("processor") may be in communication with memory 430.

The data monitoring service 410 may also include an interception component 440, an extraction and classification component 450, a filtering and publication component 460, knowledge manager component 480, and a machine learning component 490, each of which may be in communication with each other.

In one aspect, data monitoring service 410 may in communication with and/or associated with one or more databases such as, for example, storage system 34 of FIG. 1, which may be internal to the data monitoring service 410 or may be external to the data monitoring service 410. For example, the storage system 34 of FIG. 1 may be a third-party database in communication with and/or associated with the data monitoring service 410 .

As one of ordinary skill in the art will appreciate, the depiction of the various functional units in data monitoring service 410 is for purposes of illustration, as the functional units may be located within the data monitoring service 410 or elsewhere within and/or between distributed computing components.

Responsive to receiving input data 402 from a user and/or an enterprise, such as a healthcare company, the interception component 440 may intercept the input data 402 prior to publication to a public communication channel, and/or temporarily suspend publication of the input data 402 to a communication channel. Thus, the interception component 440 may retrieve the input data 402 (e.g., user input) before the input data 402 is published to a public channel.

The extraction and classification component 450 may analyze the input data (e.g., a message and one or more files such as, for example, an email with an attached file/document) to identify, detect, analyze, and/or intercept classified/private data (e.g., personal or sensitive information). Thus, the extraction and classification component 450, in association with the interception component 440, may intercepts each input data received from a user and inspect the input data 402 prior to publication to a communication channel.

Moreover, the extraction and classification component 450 may extract selected portions of the data such as, for example, extracting one or more features from the input data 402. In one aspect, one or more topics, sub-topics, data types, semantic features, or a combination thereof are identified and analyzed from the extracted features of the input data 402. Simply stated, the extraction and classification component 450 may extract features from the input data 402.

In an additional aspect, the extraction and classification component 450 may identify the selected portions (e.g., the extracted data) of the input data 402. The extraction and classification component 450 may then classify the selected portions of the data according to a degree of appropriateness relating to the one or more publishing policies or rules. That is, the extraction and classification component 450 may uses the extracted features for classifying the input data 402 according to the sensitivity of the content (e.g., a degree of appropriateness or sensitivity). The extraction and classification component 450 may indicated/identify selected portions (e.g., the extracted data) of the input data 402 having the degree of appropriateness that implicates (e.g., triggers, violates, and/or implicates non-compliance) with one or more publishing policies or rules.

Additionally, the extraction and classification component 450 may perform a comparison operation between the identified topics, additional characteristics such as, for example, the classification accuracy/uncertainty and a provided list of appropriate/sensitive topics, sub-topics, data types/formats, and publication rules.

The filtering and publication component 460 may filter the selected portions of the data according to degree of appropriateness (e.g., a level of sensitivity or required protection) defined in one or more publishing policies or rules prior to sending the filtered data to the communication channel.

Additionally, the filtering and publication component 460 may define the one or more publishing policies or rules to identify a data type, topics, sub-topics, semantic features, classifications, or a combination thereof approved for publication to the communication channel. The knowledge manager component 480, in association with the machine learning component 490 and/or filtering and publication component 460, may learn the degree of appropriateness of the data based on the one or more publishing policies or rules for publishing the data to a public channel.

Thus, the filtering and publication component 460 may forwards not-sensitive input data (e.g., input data having no sensitive data or a degree of appropriateness that does not trigger any publishing policies or rules) and/or input that has been classified as sensitive or inappropriate (e.g., a password) but that the user approved to be shared.

The filtering and publication component 460, in association with the machine learning component 490, may apply the one or more publishing policies or rules to the data using a machine learning operation.

In an additional aspect, the filtering and publication component 460 may transform (e.g., filter, anonymize, replace, data mask, etc.) the classified/private data (e.g., personal, sensitive, proprietary information) while maintaining and preserving the input data 402, which may be the anonymized/filtered data 404. For example, the filtering and publication component 460 may filter or perform a data anonymization operation (e.g., data masking, k-anonymity, differential security, etc.) on the dataset 402 to produce the anonymized/filtered data 404. The filtering and publication component 460 may apply the required transformations to the data blocks to be published to a public channel according to the requirements as specified in the knowledge manager component 480.

The filtering and publication component 460 may issue a notification to one or more users that the selected portions of the data implicates one or more publishing policies or rules based on the degree of appropriateness. Additionally, the notification may include one or more explanations indicating one or reasons for the one or more publishing policies or rules being implicated based on the degree of appropriateness. That is, the filtering and publication component 460, in association with the interception component 440 and extraction and classification component 450, may temporarily suspend publication to a communication channel until filtering the data according to the one or more publishing policies or rules, approval from a user issuing the data for publishing the filtered data, or a combination thereof In an additional aspect, the knowledge manager 480 (e.g., a knowledge base manager) is in charge of serving and providing in a distributed manner the following information. 1) A set of security policies describing the type of classified/private data (e.g., personal, sensitive, proprietary information) that the system needs to protect. 2) A set of exceptions, i.e., cases in which the classified/private data (e.g., personal, sensitive, proprietary information) may be released. 3) A set of data enforcement/security enforcement rules describing how to process each type of classified/private data (e.g., personal, sensitive, proprietary information). This information is then used to assist the extraction and classification component 450 to parse the data temporarily suspended from publication.

Additionally, the knowledge manager component 480 may also define a "public channel." For example, in one aspect, a public channel any communication and/or data distribution channel with the ability to communicate data/communication data (e.g., messages, emails, text messages, etc.) to third party users/entities. In an additional aspect, public channel any communication and/or data distribution channel with the ability to communicate data/communication data (e.g., messages, emails, text messages, etc.) in a private network (e.g., such as within a corporate, governmental, academic, or group network such as, for example, a team collaboration application/software in a network) but more than one persons have access to the private network and thus may receive the communicated data. For example, a private network may be defined as a "public channel" where a user (e.g., an employee of a company) sending an email over a private network to multiple supervisors thereby more than one person is eligible to view the published communication. Thus, as used herein, a public channel may be any data distribution means, channel, or network for publishing or sharing data (e.g., communication data such as, for example, an email) that can be accessed by other users, subscribers, or entities with limited or no privacy restrictions.

The machine learning component 490 may learn the various classified/private data (e.g., personal, sensitive, proprietary information) for each type of user and/or entity (e.g., government, business, organization, academic institution, etc.) and assist the knowledge manager 480 to identify, detect, analyze, and/or intercept classified/private data (e.g., personal or sensitive information). In one aspect, machine learning component 490 may include and/or access a knowledge domain that may include a variety of knowledge data such as, for example, data relating to the various classified/private data for each type of user and/or entity (e.g., government, business, organization, academic institution, etc.).

In one aspect, the various machine learning operations of the machine learning component 490, as described herein, may be performed using a wide variety of methods or combinations of methods, such as supervised learning, unsupervised learning, temporal difference learning, reinforcement learning and so forth. Some non-limiting examples of supervised learning which may be used with the present technology include AODE (averaged one-dependence estimators), artificial neural network, backpropagation, Bayesian statistics, naive bays classifier, Bayesian network, Bayesian knowledge base, case-based reasoning, decision trees, inductive logic programming, Gaussian process regression, gene expression programming, group method of data handling (GMDH), learning automata, learning vector quantization, minimum message length (decision trees, decision graphs, etc.), lazy learning, instance-based learning, nearest neighbor algorithm, analogical modeling, probably approximately correct (PAC) learning, ripple down rules, a knowledge acquisition methodology, symbolic machine learning algorithms, sub symbolic machine learning algorithms, support vector machines, random forests, ensembles of classifiers, bootstrap aggregating (bagging), boosting (meta-algorithm), ordinal classification, regression analysis, information fuzzy networks (IFN), statistical classification, linear classifiers, fisher's linear discriminant, logistic regression, perceptron, support vector machines, quadratic classifiers, k-nearest neighbor, hidden Markov models and boosting. Some non-limiting examples of unsupervised learning which may be used with the present technology include artificial neural network, data clustering, expectation-maximization, self-organizing map, radial basis function network, vector quantization, generative topographic map, information bottleneck method, IBSEAD (distributed autonomous entity systems based interaction), association rule learning, apriori algorithm, eclat algorithm, FP-growth algorithm, hierarchical clustering, single-linkage clustering, conceptual clustering, partitional clustering, k-means algorithm, fuzzy clustering, and reinforcement learning. Some non-limiting example of temporal difference learning may include Q-learning and learning automata. Specific details regarding any of the examples of supervised, unsupervised, temporal difference or other machine learning described in this paragraph are known and are within the scope of this disclosure. Also, when deploying one or more machine learning models, a computing device may be first tested in a controlled environment before being deployed in a public setting. Also even when deployed in a public environment (e.g., external to the controlled, testing environment), the computing devices may be monitored for compliance.

As one of ordinary skill in the art will appreciate, the data monitoring service 410 may implement mathematical modeling, probability and statistical analysis or modeling, machine reasoning, probabilistic logic, natural language processing ("NLP"), text data compression, or other data processing technologies to carry out the various mechanisms of the illustrated embodiments. In one aspect, calculations may be performed using various mathematical operations or functions that may involve one or more mathematical operations (e.g., using addition, subtraction, division, multiplication, standard deviations, means, averages, percentages, statistical modeling using statistical distributions, by finding minimums, maximums or similar thresholds for combined variables, etc.).

In view of the foregoing, consider the following operation example illustrated in FIGS. 5A-5E of the implementation of the aforementioned functionality. Turning now to FIGS. 5A-5E, exemplary operations for preventing leakage of selected information in public channels is depicted, in which various aspects of the illustrated embodiments may be implemented. Also, one or more components, functionalities, and/or features of FIGS. 1-4 may be implemented in FIGS. 5A-5E. Repetitive description of like elements, components, modules, services, applications, and/or functions employed in other embodiments described herein is omitted for sake of brevity.

As shown, the various blocks of functionality are depicted with arrows designating the steps/blocks' 500 relationships with each other and to show process flow. Additionally, descriptive information is also seen relating each of the functional blocks 500. As will be seen, many of the functional blocks may also be considered "modules" of functionality, in the same descriptive sense as has been previously described in FIGS. 1-4. With the foregoing in mind, the module blocks 500 may also be incorporated into various hardware and software components of a system for image enhancement in accordance with the present invention. Many of the functional blocks 500 may execute as background processes on various components, either in distributed computing components, or on the user device, or elsewhere, and generally unaware to the user performing.

In step 501, a user (e.g., a client application) may provide input data such as, for example, posts a message intended for a communication channel. In step 502) an interceptor removes the input data (e.g., the messages) from the communication flow path (if directed to public channels). In one aspect, the interceptor requires characterizations of non-confidential channels (e.g., a team collaboration system, public communication and/or messaging system, email system, etc.), from block 520 such as, for example, requiring either a list of public channels or a mechanism to identify when a channel is not confidential such as, for example, using a machine learning operation and/or accessing a knowledge base.

In step 503, the input data (e.g., the message) may be sent/forwarded to a semantic extractor to extract one or more features from the input data. In step 504, one or more extracted features are used for topic classification using a topic classifier. In step 505, one or more identified topic(s) may be evaluated with respect to a degree of appropriateness for publication (e.g., sensitivity level or degree of sensitivity) using a sensitivity evaluator. In step 506, if all topics/sub-topics fail to have any level or degree of appropriateness (e.g., no level of sensitivity is detected), the input data (e.g., the message) may be pushed to a publishing system "publisher" (e.g., for being published to a public channel).

In step 507, if at least one topic is deemed sensitive, the user 501 is informed/notified through a notification system (e.g., notification manager). The notification issued to the user 501 may include, but not limited to, the notification message, the identified topic(s) and explanation of system rules that are used to identify, measure, assign, and/or classify the identified topics as having a degree of appropriateness or sensitivity level requiring the input data to be filtered/transformed. The list of sensitive topics (e.g., list of topics that indicate a degree or level of appropriateness that require or do not require any level of filtered) may be use-case dependent and needs to be system defined such as, for example, by providing one or more defaults. In step 508, if the user 501 confirms the user's intention to publish the content (e.g., user 501 approves publication), the message may be forwarded to the publishing system (where the "publisher" 506 publishes to a public channel.

In step 508a, the user 501 may also provide feedback that may also be used to improve accuracy of sensitivity evaluator and topic extractor system. In step 509, the publishing system 506 (e.g., "publisher") may forward the message to an application programing interface ("API") gateway. In step 510, the input data (e.g., the message) may reaches all the intended recipient(s).

Figure 5A:
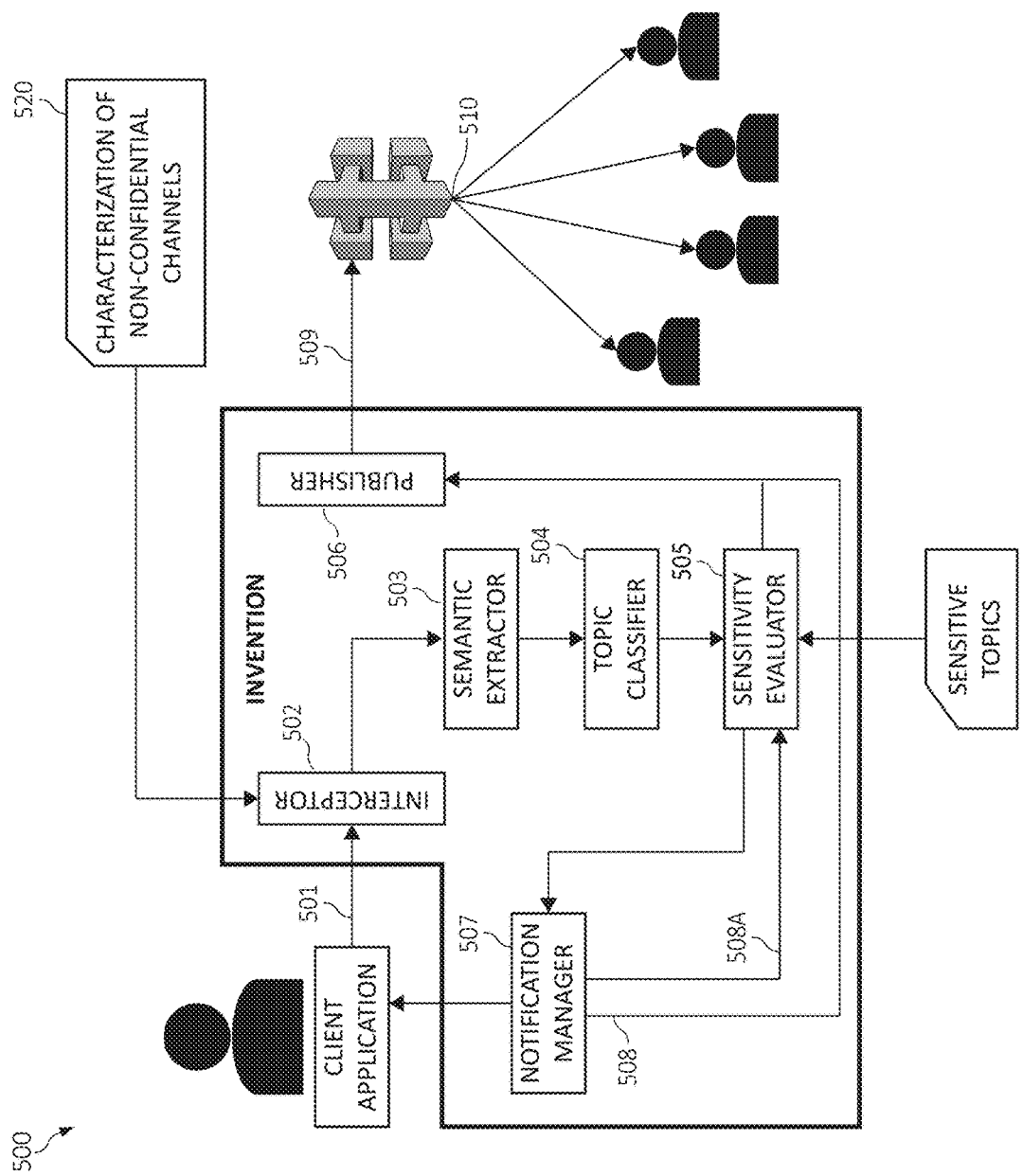
FIG. 5A-5E are diagrams depicting exemplary operations for preventing leakage of selected information in public channels in accordance with aspects of the present invention.

Using the various operations and components of FIG. 5A, consider the various examples (e.g., examples 1-4) for preventing leakage of selected information in public channels illustrated in FIGS. 5B-5E.

Figure 5B:
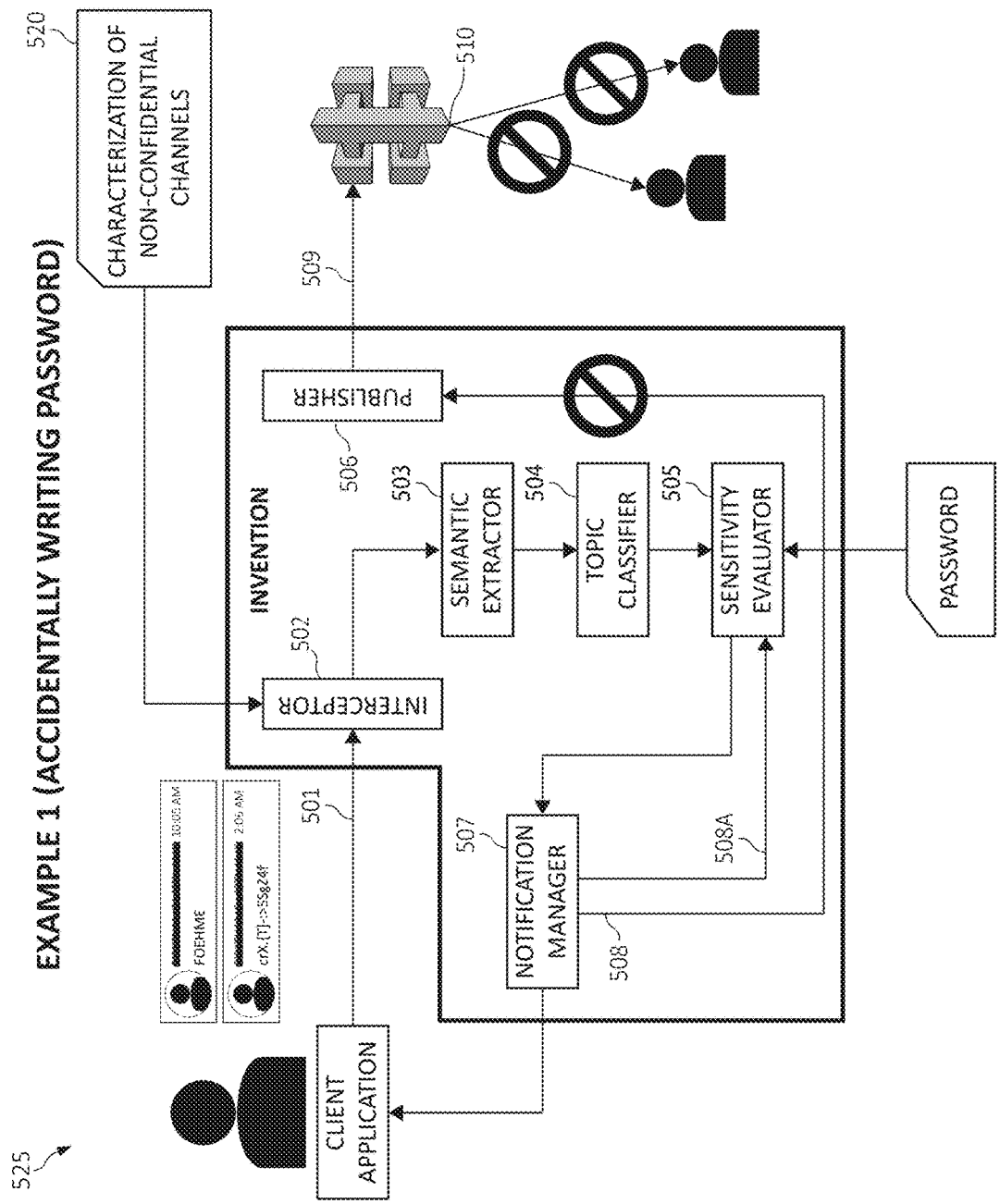
Figure 5C:
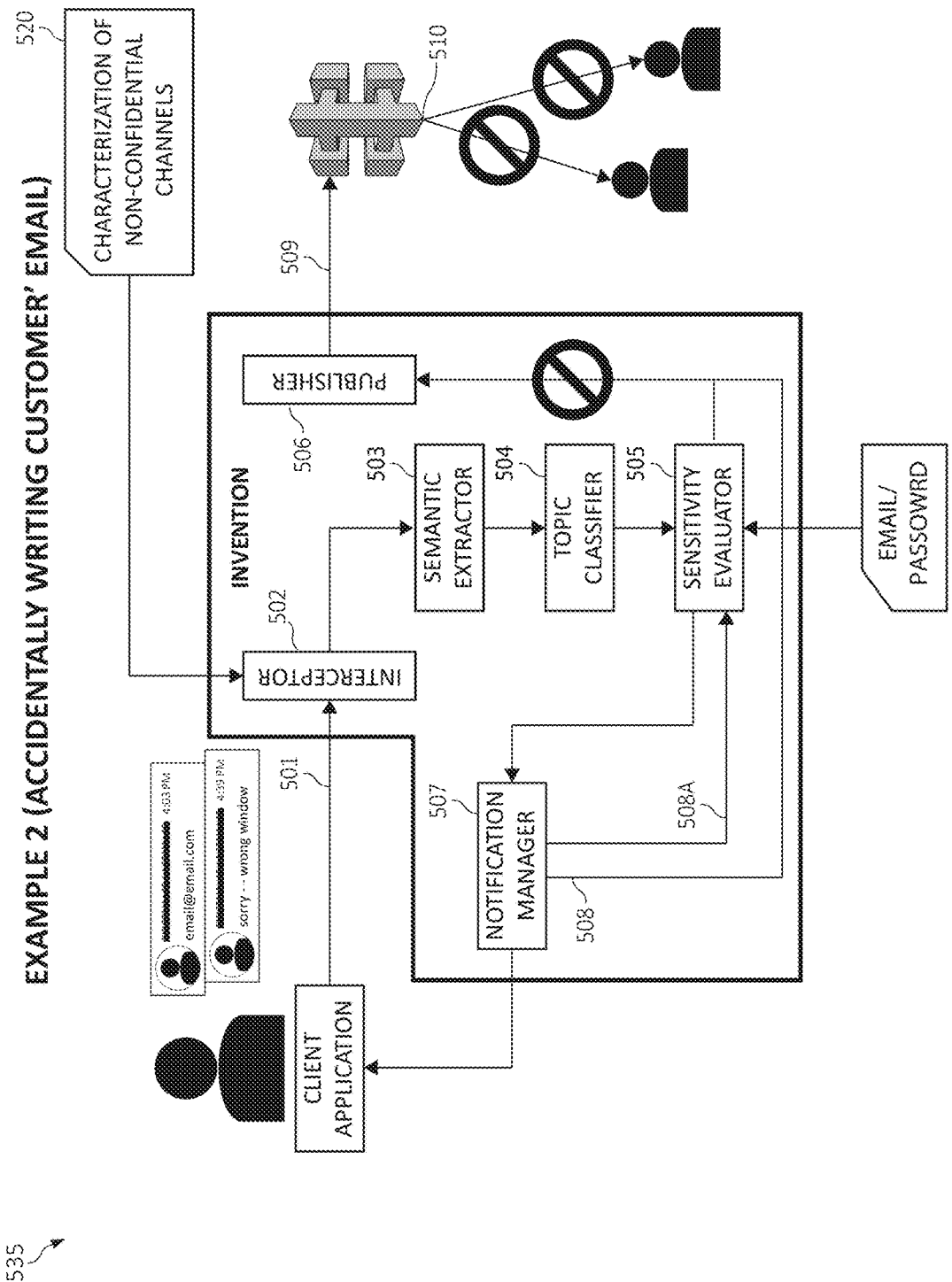

As depicted in FIGS. 5B-5C, in step 501, the user writes a password or writes a messages containing an email address (as the input data) to a channel. The content may be analyzed and marked as potentially containing potentially containing a password (e.g., at least 15 characters, at least one digit, at least a symbol, and no dictionary words).

In step 502, the interceptor intercepts the input data (e.g., the password of FIG. 5B and/or the email address in the message of FIG. 5C) from the communication flow path. In one aspect, the interceptor requires characterizations of non-confidential channels (e.g., a team collaboration system, public communication and/or messaging system, email system, etc.), from block 520 such as, for example, requiring either a list of public channels or a mechanism to identify when a channel is not confidential such as, for example, using a machine learning operation and/or accessing a knowledge base.

In step 503, the input data (e.g., the password of FIG. 5B and/or the email address in the message of FIG. 5C) may be sent/forwarded to a semantic extractor to extract one or more features from the input data. In step 504, one or more extracted features are used for topic classification. In step 505, one or more identified topic(s) may be evaluated with respect to a degree of appropriateness for publication (e.g., sensitivity level or degree of sensitivity). For example, in FIG. 5B, the content is analyzed and marked as potentially containing a password (e.g., at least 15 characters, at least one digit, at least a symbol, and no dictionary words). As in FIG. 5B, the content is analyzed and marked as potentially containing an email.

In step 506, all the input data (e.g., the password of FIG. 5B and/or the email address in the message of FIG. 5C) are indicated as having a level or degree of appropriateness (e.g., no level of sensitivity is detected), the input data (e.g., the message) and are not pushed to a publishing system (e.g., for being published to a public channel).

In step 507, the input data (e.g., the password of FIG. 5B and/or the email address in the message of FIG. 5C) are deemed sensitive, the user is informed/notified through a notification system (e.g., notification manager). That is, the user 501 is notified about the potential error/mistake. For example, the user 501 is notified in FIG. 5B of the mistake of including the password in the input data. In FIG. 5C, the user 501 is notified of the mistake of including the email (e.g., the customer's email). The user 501 may confirm there is no intent/desire to share the password with the public (e.g., no intent on sharing the password to fellow employers in a business), as in FIG. 5B, and/or the user 501 may confirm there is no intent/desire to share the customer's email with the public (e.g., no intent on sharing the customer's email to fellow employers in a business, as in FIG. 5C.

In step 509, the publishing system (e.g., "publisher) rejects forward the input data (e.g., the password of FIG. 5B and/or the email address in the message of FIG. 5C)to an application programing interface ("API") gateway and does not ("fails) reach all the intended recipient(s). That is, the user does not share the user's password (of FIG. 5B) or the customer's email (of FIG. 5C) with the user's entire company that has access to the channel.

As depicted in FIGS. 5B-5E, in step 501, the user writes a password, writes a messages containing an email address (as the input data), and/or shares a confidential document to a channel.

In step 502), the interceptor intercepts the input data (e.g., the password of FIG. 5B, the email address in the message of FIG. 5C, and/or the confidential document of FIG. 5D and FIG. 5E) from the communication flow path. In one aspect, the interceptor requires characterizations of non-confidential channels (e.g., a team collaboration system, public communication and/or messaging system, email system, etc.), from block 520 such as, for example, requiring either a list of public channels or a mechanism to identify when a channel is not confidential such as, for example, using a machine learning operation and/or accessing a knowledge base.

In step 503), the input data (e.g., the password of FIG. 5B, the email address in the message of FIG. 5C, and/or the confidential document of FIG. 5D and FIG. 5E) may be sent/forwarded to a semantic extractor to extract one or more features from the input data. In step 504, one or more extracted features are used for topic classification.

Figure 5D:
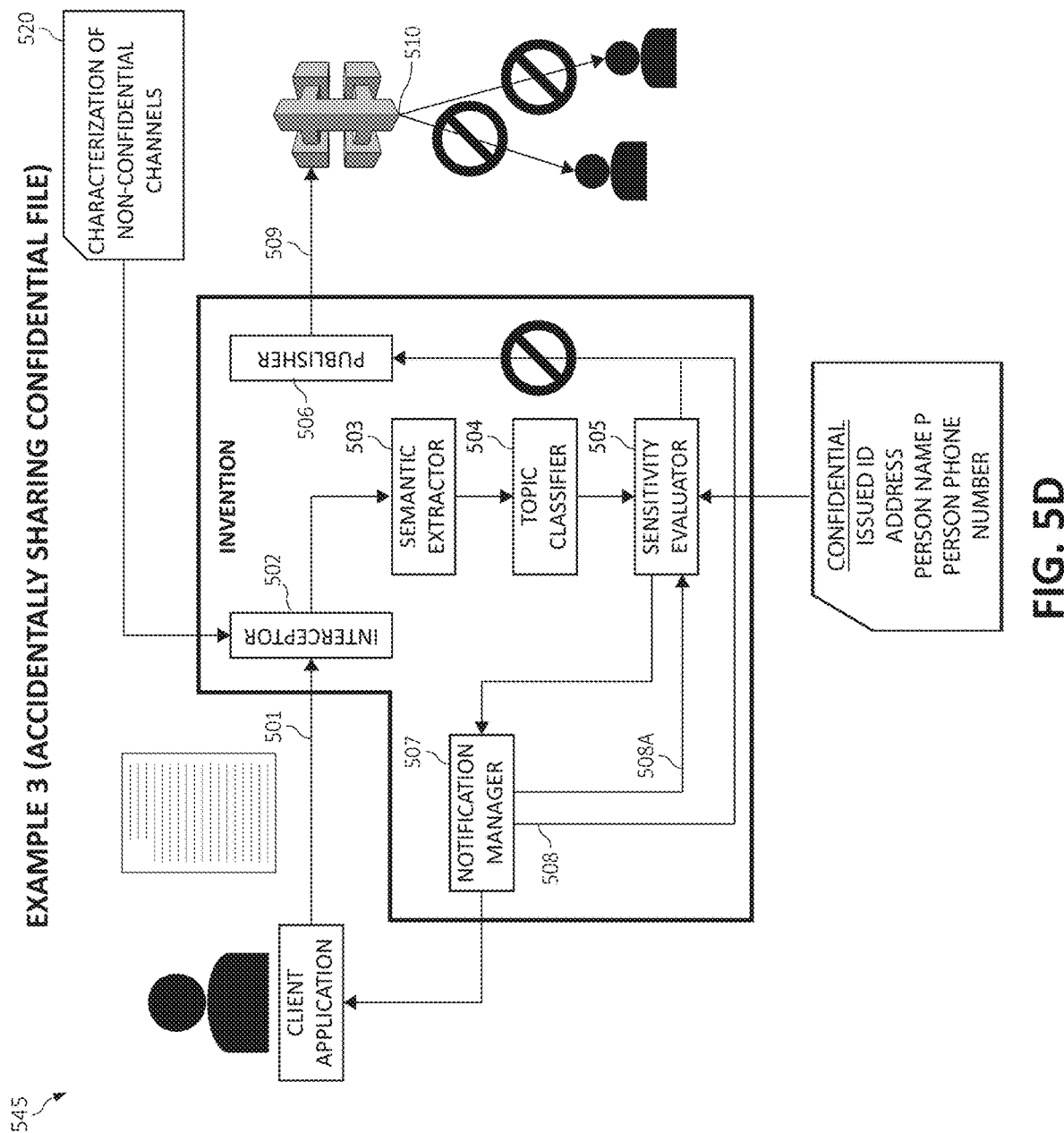
Figure 5E:
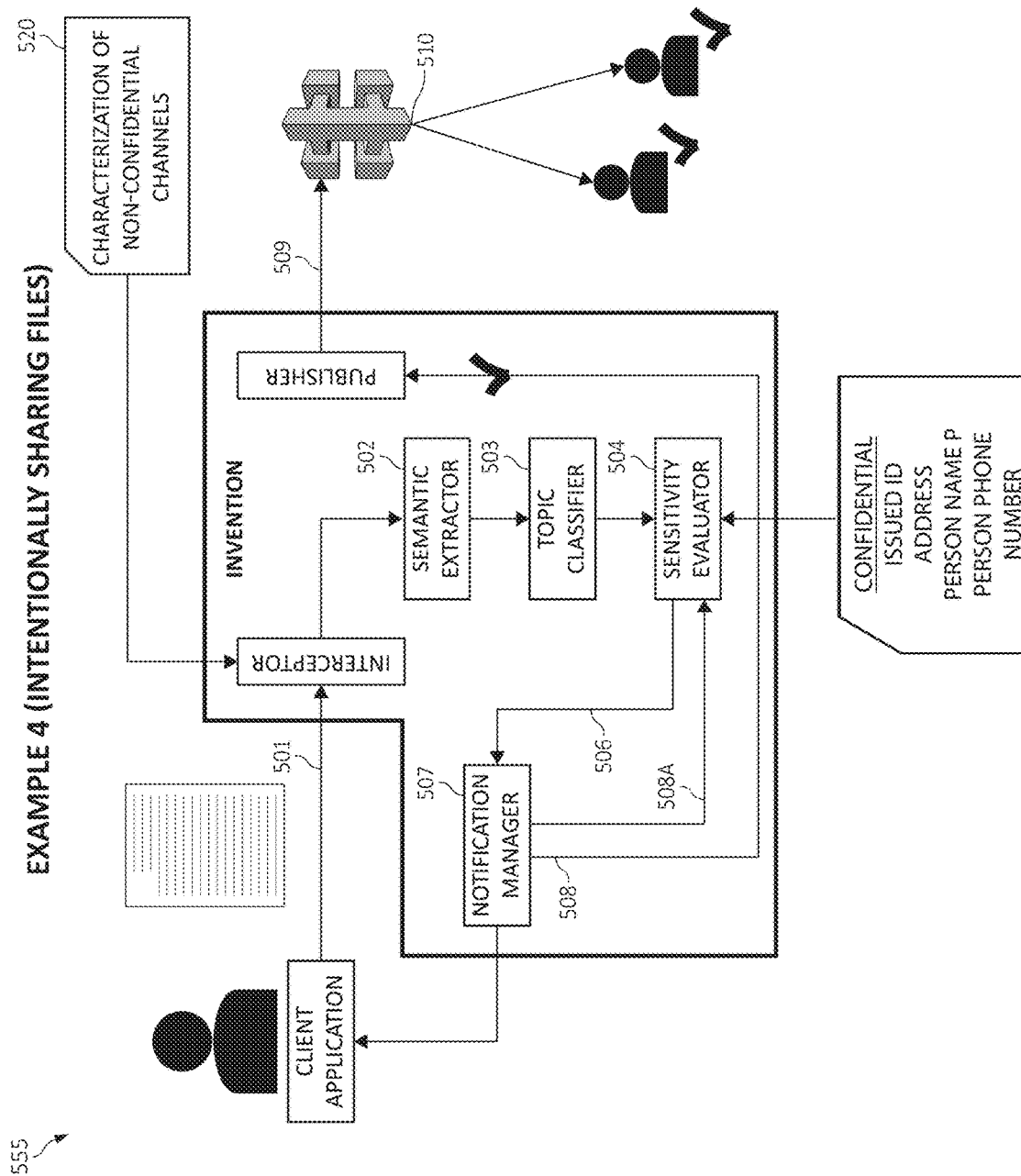

In step 505, one or more identified topic(s) may be evaluated with respect to a degree of appropriateness for publication (e.g., sensitivity level or degree of sensitivity). For example, in FIG. 5B, the content of the extracted data is analyzed and marked as potentially containing a password (e.g., at least 15 characters, at least one digit, at least a symbol, and no dictionary words. As in FIG. 5C, the content of the extracted data is analyzed and marked as potentially containing an email. In FIG. 5D-5E, the content of the extracted data is analyzed and marked as potentially containing sensitive information (e.g., personal identification information "PII") such as, for example, user names, addresses, phone numbers, government issued identification ("ID") numbers, and/or language marked as "confidential," "classified,", and/or "private."

In step 506, all the input data (e.g., the password of FIG. 5B, the email address in the message of FIG. 5C, and/or the confidential document of FIG. 5D and FIG. 5E) have a level or degree of appropriateness (e.g., a level of sensitivity is detected), the input data (e.g., the message) and are not sent to a publishing system (e.g., for being published to a public channel).

In step 507, the input data (e.g., the password of FIG. 5B, the email address in the message of FIG. 5C, and/or the confidential document of FIG. 5D and FIG. 5E) are deemed sensitive, the user is informed/notified through a notification system (e.g., notification manager). For example, the user is notified in FIG. 5B of the mistake of including the password in the input data. In FIG. 5C, the user is notified of the mistake of including the email (e.g., the customer's email). In FIG. 5D and FIG. 5E, the user is notified of the mistake of including the confidential document.

In step 509, the publishing system (e.g., "publisher) rejects forward the input data (e.g., the password of FIG. 5B and/or the email address in the message of FIG. 5C) to an application programing interface ("API") gateway and does not ("fails) reach all the intended recipient(s). That is, the user does not share the user's password (of FIG. 5B), the customer's email (of FIG. 5C), and/or the confidential document (of FIGS. 5D) with the public channel (e.g., a network or multi-party accessible system/team collaboration application associated with the user's entire company) that has access to the public channel.

However, as illustrated in FIG. 5E, the user confirms the content is not sensitive (e.g., an audit log potentially preserved) and the data is shared, in step 510, the with all the intended recipient(s) (as compared to not sharing the confidential document in FIG. 5D).

Figure 6:
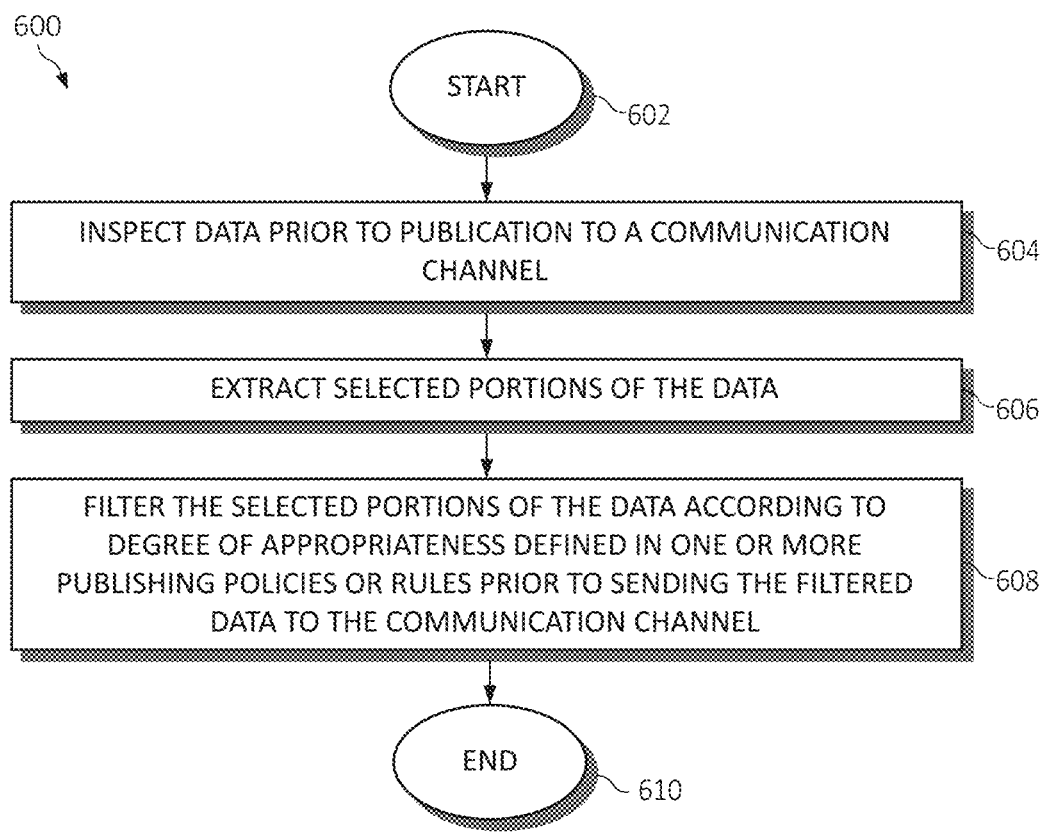
FIG. 6 is a flowchart diagram depicting an exemplary method for preventing leakage of selected information in public channels in a computing environment in a computing environment in which aspects of the present invention may be realized.

Turning now to FIG. 6, a method 600 for preventing disclosure of confidential data in a computing environment is depicted, in which various aspects of the illustrated embodiments may be implemented. The functionality 600 may be implemented as a method executed as instructions on a machine, where the instructions are included on at least one computer readable storage medium or one non-transitory machine-readable storage medium. The functionality 600 may start in block 602.

Data may be inspected prior to publication to a communication channels, as in block 604. Selected portions of the data may be extracted, as in block 606. The selected portions of the data may be filtered according to degree of appropriateness defined in one or more publishing policies or rules prior to sending the filtered data to the communication channel, as in block 608. The functionality 600 may end in block 610.

In one aspect, in conjunction with and/or as part of at least one block of FIG. 6, the operations 600 may include one or more of each of the following. The operations of 600 may intercept the data prior to publication to a public communication channel, and extract one or more features from the data for extracting selected portions of the data. One or more topics, sub-topics, data types, semantic features, or a combination thereof are identified from the one or more features of the data.

The operations of 600 may identify the selected portions of the data having the degree of appropriateness that implicates the one or more publishing policies or rules, and/or classify the selected portions of the data according to the degree of appropriateness relating to the one or more publishing policies or rules.

classify the selected portions of the data according to the degree of appropriateness relating to the one or more publishing policies or rules. The operations of 600 may issue a notification to one or more users that the selected portions of the data that implicates the one or more publishing policies or rules based on the degree of appropriateness, wherein the notification includes one or more explanations indicating one or reasons for the one or more publishing policies or rules being implicated based on the degree of appropriateness.

The operations of 600 may define the one or more publishing policies or rules to identify a data type, topics, sub-topics, semantic features, classifications, or a combination thereof approved for publication to the communication channel, learn the degree of appropriateness of the data based on the one or more publishing policies or rules for publishing the data to a public channel, apply the one or more publishing policies or rules to the data using a machine learning operation, and/or temporarily suspend publication to the communication channel until filtering the data according to the one or more publishing policies or rules, approval from a user issuing the data for publishing the filtered data, or a combination thereof.

intercept and/or inspect the selected data prior to performing the write operation or the read operation in the shared computing file system. The operations of 800 may determine or infer data format information of the selected data relating to the write operation or the read operation, and/or determine the selected data relating to the write operation or the read operation implicates the one or more data security policies or rules.

The operations of 800 may replace the selected data with anonymized data according to the one or more data security policies or rules, and/or filter the selected data relating to the write operation or the read operation according to the one or more data security policies or rules.

The operations of 800 may define the one or more data security policies or rules to include types and formats of data for preserving data security, define the one or more data security policies or rules to one or more operations to perform for preserving data security, and/or apply the one or more data security policies or rules to the write operation or the read operation using a machine learning operation.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method, by a processor, for preventing disclosure of confidential data in a computing environment, comprising:
executing machine learning logic to learn a degree of appropriateness of data based on one or more publishing policies or rules for publishing the data to a communication channel, wherein learning the degree of appropriateness includes using the one or more publishing policies or rules for publishing the data to infer the degree of appropriateness of the data with specific respect to transmitting the data through the communication channel, versus the degree of appropriateness with respect to transmitting the data through alternative communication channels, notwithstanding whether the communication channel nor information in the data explicitly is referenced in the one or more publishing policies or rules for publishing, and wherein inferring the degree of appropriateness of the data further includes identifying that the information in the data is of a particular composition able to be deduced as sensitive data;
inspecting the data prior to publication to the communication channel;
extracting selected portions of the data; and
filtering the selected portions of the data according to the degree of appropriateness prior to sending the filtered data to the communication channel.

2. The method of claim 1, further including intercepting the data prior to publication to a public communication channel.

3. The method of claim 1, wherein extracting selected portions of the data further includes extracting one or more features from the data, wherein one or more topics, sub-topics, data types, semantic features, or a combination thereof are identified from the one or more features of the data.

4. The method of claim 1, further including classifying the selected portions of the data according to the degree of appropriateness relating to the one or more publishing policies or rules.

5. The method of claim 1, further including identifying the selected portions of the data having the degree of appropriateness that implicates the one or more publishing policies or rules.

6. The method of claim 1, further including issuing a notification to one or more users that the selected portions of the data that implicates the one or more publishing policies or rules based on the degree of appropriateness, wherein the notification includes one or more explanations indicating one or reasons for the one or more publishing policies or rules being implicated based on the degree of appropriateness.

7. The method of claim 1, further including:
defining the one or more publishing policies or rules to identify a data type, topics, sub-topics, semantic features, classifications, or a combination thereof approved for publication to the communication channel; and
temporarily suspending publication to the communication channel until filtering the data according to the one or more publishing policies or rules, approval from a user issuing the data for publishing the filtered data, or a combination thereof.

8. A system preventing disclosure of confidential data in a computing environment, comprising:
one or more computers with executable instructions that when executed cause the system to:
execute machine learning logic to learn a degree of appropriateness of data based on one or more publishing policies or rules for publishing the data to a communication channel, wherein learning the degree of appropriateness includes using the one or more publishing policies or rules for publishing the data to infer the degree of appropriateness of the data with specific respect to transmitting the data through the communication channel, versus the degree of appropriateness with respect to transmitting the data through alternative communication channels, notwithstanding whether the communication channel nor information in the data explicitly is referenced in the one or more publishing policies or rules for publishing, and wherein inferring the degree of appropriateness of the data further includes identifying that the information in the data is of a particular composition able to be deduced as sensitive data;
inspect the data prior to publication to the communication channel;
extract selected portions of the data; and
filter the selected portions of the data according to the degree of appropriateness prior to sending the filtered data to the communication channel.

9. The system of claim 8, wherein the executable instructions intercept the data prior to publication to a public communication channel.

10. The system of claim 8, wherein the executable instructions, for extracting selected portions of the data, extracts one or more features from the data, wherein one or more topics, sub-topics, data types, semantic features, or a combination thereof are identified from the one or more features of the data.

11. The system of claim 8, wherein the executable instructions classify the selected portions of the data according to the degree of appropriateness relating to the one or more publishing policies or rules.

12. The system of claim 8, wherein the executable instructions identify the selected portions of the data having the degree of appropriateness that implicates the one or more publishing policies or rules.

13. The system of claim 8, wherein the executable instructions issue a notification to one or more users that the selected portions of the data that implicates the one or more publishing policies or rules based on the degree of appropriateness, wherein the notification includes one or more explanations indicating one or reasons for the one or more publishing policies or rules being implicated based on the degree of appropriateness.

14. The system of claim 8, wherein the executable instructions:
define the one or more publishing policies or rules to identify a data type, topics, sub-topics, semantic features, classifications, or a combination thereof approved for publication to the communication channel; and
temporarily suspend publication to the communication channel until filtering the data according to the one or more publishing policies or rules, approval from a user issuing the data for publishing the filtered data, or a combination thereof.

15. A computer program product for, by a processor, preventing disclosure of confidential data in a computing environment, the computer program product comprising a non-transitory computer-readable storage medium having computer-readable program code portions stored therein, the computer-readable program code portions comprising:
an executable portion that executes machine learning logic to learn a degree of appropriateness of data based on one or more publishing policies or rules for publishing the data to a communication channel, wherein learning the degree of appropriateness includes using the one or more publishing policies or rules for publishing the data to infer the degree of appropriateness of the data with specific respect to transmitting the data through the communication channel, versus the degree of appropriateness with respect to transmitting the data through alternative communication channels, notwithstanding whether the communication channel nor information in the data explicitly is referenced in the one or more publishing policies or rules for publishing, and wherein inferring the degree of appropriateness of the data further includes identifying that the information in the data is of a particular composition able to be deduced as sensitive data;
an executable portion that inspects the data prior to publication to the communication channel;
an executable portion that extracts selected portions of the data; and
an executable portion that filters the selected portions of the data according to the degree of appropriateness prior to sending the filtered data to the communication channel.

16. The computer program product of claim 15, further including an executable portion that:
intercepts the data prior to publication to a public communication channel; or
extracts one or more features from the data for extracting the selected portions of the data, wherein one or more topics, sub-topics, data types, semantic features, or a combination thereof are identified from the one or more features of the data.

17. The computer program product of claim 15, further including an executable portion that classifies the selected portions of the data according to the degree of appropriateness relating to the one or more publishing policies or rules.

18. The computer program product of claim 15, further including an executable portion that identifies the selected portions of the data having the degree of appropriateness that implicates the one or more publishing policies or rules.

19. The computer program product of claim 15, further including an executable portion that issues a notification to one or more users that the selected portions of the data that implicates the one or more publishing policies or rules based on the degree of appropriateness, wherein the notification includes one or more explanations indicating one or reasons for the one or more publishing policies or rules being implicated based on the degree of appropriateness.

20. The computer program product of claim 15, further including an executable portion that:
  defines the one or more publishing policies or rules to identify a data type, topics, sub-topics, semantic features, classifications, or a combination thereof approved for publication to the communication channel; and
  temporarily suspends publication to the communication channel until filtering the data according to the one or more publishing policies or rules, approval from a user issuing the data for publishing the filtered data, or a combination thereof.

* * * * *